United States Patent
Kotecha et al.

(10) Patent No.: US 9,590,710 B2
(45) Date of Patent: *Mar. 7, 2017

(54) FEEDBACK SCHEDULING TO REDUCE FEEDBACK RATES IN MIMO SYSTEMS

(71) Applicant: Apple Inc., Cupertino, CA (US)

(72) Inventors: Jayesh H. Kotecha, Austin, TX (US); Kaibin Huang, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,422

(22) Filed: Jul. 6, 2015

(65) Prior Publication Data

US 2015/0311965 A1 Oct. 29, 2015

Related U.S. Application Data

(60) Continuation of application No. 14/217,026, filed on Mar. 17, 2014, now Pat. No. 9,077,411, which is a
(Continued)

(51) Int. Cl.
*H04B 7/04* (2006.01)
*H04B 7/06* (2006.01)
(Continued)

(52) U.S. Cl.
CPC ......... *H04B 7/0478* (2013.01); *H04B 7/0417* (2013.01); *H04B 7/0643* (2013.01);
(Continued)

(58) Field of Classification Search
USPC ....................................................... 375/260
See application file for complete search history.

(56) References Cited

U.S. PATENT DOCUMENTS

| 6,741,837 B1 | 5/2004 | Nakano et al. |
| 7,145,889 B1 * | 12/2006 | Zhang et al. ................. 370/329 |

(Continued)

FOREIGN PATENT DOCUMENTS

| EP | 1508992 | 2/2005 |
| JP | 2002232334 | 8/2002 |

(Continued)

OTHER PUBLICATIONS

Jeon et al "Channel Adaptive CQI Reporting Schemes for UMTS High-Speed Downlink Packet Access." In: Vehicular Technology Conference, 2006. VTS-2006 Fall. 2006 IEEE 64th, Sep. 2006, pp. 1-5.*

(Continued)

*Primary Examiner* — Kevin M Burd
(74) *Attorney, Agent, or Firm* — Meyertons, Hood, Kivlin, Kowert & Goetzel, P.C.

(57) ABSTRACT

In a closed-loop wireless communication system, a codebook-based feedback control mechanism is provided where feedback from each of a plurality of receivers is scheduled to control the feedback so that the receiving devices do not needlessly feed back precoding information to the transmitting device. The feedback may be controlled by establishing and distributing a schedule to control when each receiver feeds back precoding information, or by establishing and distributing a metric-based feedback threshold that must be satisfied before feedback is permitted.

18 Claims, 6 Drawing Sheets

Related U.S. Application Data division of application No. 11/833,669, filed on Aug. 3, 2007, now Pat. No. 8,675,743.

(51) Int. Cl.
| | | |
|---|---|---|
| *H04L 12/26* | (2006.01) | |
| *H04W 72/04* | (2009.01) | |
| *H04L 5/00* | (2006.01) | |
| *H04L 25/03* | (2006.01) | |

(52) U.S. Cl.
CPC .......... *H04L 5/0078* (2013.01); *H04L 5/0094* (2013.01); *H04L 43/0864* (2013.01); *H04W 72/0446* (2013.01); *H04B 7/0452* (2013.01); *H04L 5/0007* (2013.01); *H04L 5/0075* (2013.01); *H04L 2025/03808* (2013.01)

(56) References Cited

U.S. PATENT DOCUMENTS

| | | | | |
|---|---|---|---|---|
| 8,675,743 | B2* | 3/2014 | Kotecha et al. | 375/260 |
| 9,077,411 | B2* | 7/2015 | Kotecha et al. | 375/260 |
| 2002/0085491 | A1* | 7/2002 | Beshai et al. | 370/230 |
| 2002/0163695 | A1 | 11/2002 | Unitt et al. | |
| 2003/0036359 | A1 | 2/2003 | Dent et al. | |
| 2003/0153272 | A1 | 8/2003 | Takano | |
| 2005/0215251 | A1 | 9/2005 | Krishnan et al. | |
| 2006/0079221 | A1 | 4/2006 | Grant et al. | |
| 2007/0060178 | A1* | 3/2007 | Gorokhov | H04L 5/006 455/506 |
| 2008/0095110 | A1 | 4/2008 | Montojo et al. | |
| 2008/0096488 | A1* | 4/2008 | Cho et al. | 455/69 |
| 2008/0165698 | A1* | 7/2008 | Dalsgaard | H04W 24/10 370/252 |
| 2008/0268785 | A1 | 10/2008 | McCoy et al. | |
| 2009/0147869 | A1 | 6/2009 | Duan et al. | |
| 2010/0183086 | A1 | 7/2010 | Ko et al. | |

FOREIGN PATENT DOCUMENTS

| | | |
|---|---|---|
| JP | 2006352884 | 12/2006 |
| WO | 0176110 | 10/2001 |
| WO | 2004049613 | 6/2004 |
| WO | 2005089004 | 9/2005 |
| WO | 2005125020 | 12/2005 |
| WO | 2006020339 | 2/2006 |
| WO | 2007023515 | 3/2007 |
| WO | 2007024936 | 3/2007 |
| WO | 2007034860 | 3/2007 |

OTHER PUBLICATIONS

Office Action from Korean Application No. 10-2014-7036616, issued Feb. 11, 2015, Korean and English versions, pp. 1-13.
Office Action from Japanese Application No. 2013246650, issued Jan. 5, 2015, English and Japanese versions, pp. 1-11.
V. Hassel et al., "Exploiting Multiuser Diversity Using Multiple Feedback Thresholds," In Proc. IEEE Vehicular Technology Conference (VTC'05—spring), Stockholm, Sweden (May 2005).
B.C. Banister et al., "A Simple Gradient Sign Algorithm for Transmit Antenna Weight Adaptation with Feedback," IEEE Transactions on Signal Processing, vol. 51, No. 5, (May 2003).
D. Gesbert et al., "How Much Feedback is Multi-User Diversity Really Worth?" IEEE International Conference on Communications, Paris, France (Jun. 20-24, 2004).
V. Hassel et al., "A Threshold-Based Feedback Algorithm for Exploiting Multiuser Diversity," Dec. 21, 2005.
V. Hassel et al., "Exploiting Multiuser Diversity Using Multiple Feedback Thresholds," 2005 http://www.tele.ntnu.no/projeels/cuban/.
K. Huang et al., "Effect of Feedback Delay on Multi-Antenna Limited Feedback for Temporally-Correlated Channels," Proceedings of IEEE Globecom 2006, (Nov. 27-Dec. 1, 2006).
K. Huang et al., "Joint Beamforming and Scheduling for SOMA Systems with Limited Feedback," Jun. 29, 2006 (http://aps.arxiv.org/PS_cache/cs/pdf/0606/0606121 v2 .pdf).
K. Huang et al., "Limited Feedback for Temporally-Correlated Channels: Feedback Rate and Delay," Jun. 6, 2006 (http://arxiv.org/PS_cache/cs/pdf/0606/0606022v1 .pdf).
K. Huang et al., "Markov Models for Limited Feedback MIMO Systems," Proceedings of IEEE ICASSP, May 2006 (http://users.ece.utexas.edu/-khuang/Papers/ICASSP06_Markov.pdf).
K. Huang et al., "Multi-Antenna Limited Feedback for Temporally-Correlated Channels: Feedback Compression," Proceedings of IEEE Globecom 2006, Nov. 27-Dec I 2006 (http://www.ece.utexas.edu/-khuang/Papers/Giobecom06_FbCmp.pdf).
K. Huang et al., "Orthogonal Beamforming in SOMA Downlink with Limited Feedback," IEEE Inti. Conf. on Acoustics, Speech, and Signal Prox. (ICASSP) (May 207) (http://users.ece.utexas.edu/-khuang/Papers/D200609_1CASSP _SDMA.pdf).
J.C. Roh et al., "An Efficient Feedback Method for MIMO Systems with Slowly Time-Varying Channels," Wireless Communications and Networking Conference, vol. 2, Issue 21-25 pp. 760-764 (Mar. 2004).
T. Tang et al., "Opportunistic Feedback for Multiuser MIMO Systems with Linear Receivers," IEEE Transactions on Communications, vol. 55, No. 5, pp. 1020-1032, May 2007.
"Frequency Domain Adaptive Preceding for E-UTRA MIMO," 3GPP TSG RAN WG1, Seoul, South Korea, Oct. 9-13, 2006.
International Search Report for corresponding PCT Application No. PCT/US08/69059 mailed Nov. 14, 2008.
English Abstract of JP Application 2002232334. published Aug. 16, 2002.
U.S. Appl. No. 60/842,619, filed Sep. 5, 2006.
Motorola: 11 Preceding Feedback Overhead 11, 3GPP Draft; R1-070158 Precoding Feedback Overhead, 3rd Generation Partnership Project (3GPP), Mobile Competence Centre, vol. RAN WG1, Jan. 10, 2007 (Jan. 10, 2007), XP050104204, Sophia-Antipolis Cedex; France [retrieved on Jan. 10, 2007]. *Section 1. p. 2, paragraph 1—paragraph 2 page 3*.
Panasonic: "COI Feedback Control and Content in E-UTRA". 3GPP Draft; R1-072077, 3rd Generation Partnership Project (3GPP), Mobile Competence Centre, vol. RAN WG11, May 2, 2007 (May 2, 2007), XP050105831, Sophia-Antipolis Cedex; France [retrieved on May 2, 2007]Section 2 **Section 3 * * Sections 4, 4.1 *.
Motorola, Joint Feedback for E-UTRA downlink preceding and COI [online], 3GPP TSG-RAN WG1#49b R1-072701, Internet <URL:http://www2gpp.org/ftp/tsg_ran/WG1RL 1/TSGR1_49b/Docs/R1-072701.zio>.
Jeon et al "Channel Adaptive CQI Reporting Schemes for UMTS High-Speed Downlink Packet Access." In: Vehicular Technology Conference, 2006. VTS-2006 Fall. 2006 IEEE 64th, Sept. 2006, pp. 1-5.

* cited by examiner

FEEDBACK SCHEDULING TO REDUCE FEEDBACK RATES IN MIMO SYSTEMS

PRIORITY CLAIM

This application is a continuation of and claims the benefit of priority from U.S. patent application Ser. No. 14/217,026, entitled "Feedback Scheduling to Reduce Feedback Rates in MIMO Systems" and filed on Mar. 17, 2014, which has been designated to issue as U.S. Pat. No. 9,077,411, and which is a divisional of U.S. Pat. No. 8,675,743, entitled "Feedback Scheduling to Reduce Feedback Rates in MIMO Systems" and filed on Aug. 3, 2007, which are fully incorporated herein by reference for all purposes to the extent not inconsistent with this application or local law.

BACKGROUND

Field of the Invention

The present invention is directed in general to field of information processing. In one aspect, the present invention relates to a system and method for scheduling feedback from a plurality of receivers.

Description of the Related Art

Wireless communication systems transmit and receive signals within a designated electromagnetic frequency spectrum, but capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed, such as Multiple Input Multiple Output (MIMO), which is a transmission method involving multiple transmit antennas and multiple receive antennas. Various transmission strategies require the transmit array to have some level of knowledge concerning the channel response between each transmit antenna element and each receive antenna element, and are often referred to as "closed-loop" MIMO. For example, space division multiple access (SDMA) systems can be implemented as closed-loop systems to improve spectrum usage efficiency by applying precoding at the transmitter to take into account the transmission channel characteristics, thereby improving data rates and link reliability. SDMA based methods have been adopted in several current emerging standards such as IEEE 802.16 and the 3rd Generation Partnership Project (3GPP) Long Term Evolution (LTE) platform.

FIG. 1 depicts a wireless communication system 100 in which a transmitter 102 having a first antenna array 106 communicates with receiver 104 having a second antenna array 108, where each antenna array includes one or more antennas. The communication system 100 may be any type of wireless communication system, including but not limited to a MIMO system, SDMA system, CDMA system, OFDMA system, OFDM system, etc. In the communication system 100, the transmitter 102 may act as a base station, while the receiver 104 acts as a subscriber station, which can be virtually any type of wireless one-way or two-way communication device such as a cellular telephone, wireless equipped computer system, and wireless personal digital assistant. Of course, the receiver/subscriber station 104 can also transmits signals which are received by the transmitter/base station 102. The signals communicated between transmitter 102 and receiver 104 can include voice, data, electronic mail, video, and other data, voice, and video signals. In operation, the transmitter 102 transmits a signal data stream (e.g., signal $s_1$) through one or more antennas 106 and over a channel $H_1$ to a receiver 104, which combines the received signal from one or more receive antennas 108 to reconstruct the transmitted data. To transmit the signal $s_1$, the transmitter 102 prepares a transmission signal, represented by the vector $x_1$, for the signal $s_1$. (Note: lower case bold variables indicate vectors and upper case BOLD variables indicate matrices). The transmission signal vector $x_1$ is transmitted via a channel represented by a channel matrix $H_1$, and is received at the receiver 104 as a receive signal vector $y_1 = H_1 x_1 + n_1$ (where n represents co-channel interference or noise). The channel matrix $H_1$ represents a channel gain between the transmitter antenna array 106 and the subscriber station antenna array 108. Thus, the channel matrix $H_1$ can be represented by a k×N matrix of complex coefficients, where N is the number of antennas in the base station antenna array 106 and k is the number of antennas in the subscriber station antenna array 108. The value of k can be unique for each subscriber station. As will be appreciated, the channel matrix $H_1$ can instead be represented by a N×k matrix of complex coefficients, in which case the matrix manipulation algorithms are adjusted accordingly so that, for example, the right singular vector calculation on a k×N channel matrix becomes a left singular vector calculation on a N×k channel matrix. The coefficients of the channel matrix $H_1$ depend, at least in part, on the transmission characteristics of the medium, such as air, through which a signal is transmitted. A variety of methods may be used at the receiver to determine the channel matrix $H_1$ coefficients, such as transmitting a known pilot signal to a receiver so that the receiver, knowing the pilot signal, can estimate the coefficients of the channel matrix $H_1$ using well-known pilot estimation techniques. Alternatively, when the channel between the transmitter and receiver are reciprocal in both directions, the actual channel matrix $H_1$ is known to the receiver and may also be known to the transmitter.

While the benefits of MIMO are realizable when the receiver 104 alone knows the communication channel, these benefits are further enhanced in "closed-loop" MIMO systems when the transmitter 102 has some level of knowledge concerning the channel response between each transmit antenna element and each receive antenna element. Precoding systems provide an example application of closed-loop systems which exploit channel-side information at the transmitter ("CSIT"). With precoding systems, CSIT can be used with a variety of communication techniques to operate on the transmit signal before transmitting from the transmit antenna array 106. For example, precoding techniques can provide a multi-mode beamformer function to optimally match the input signal on one side to the channel on the other side. In situations where channel conditions are unstable or unknown, open loop MIMO techniques such as spatial multiplexing can be used. However, when the channel conditions can be provided to the transmitter, closed loop MIMO methods such as precoding can be used. Precoding techniques may be used to decouple the transmit signal into orthogonal spatial stream/beams, and additionally may be used to send more power along the beams where the channel is strong, but less or no power along the weak, thus enhancing system performance by improving data rates and link reliability. In addition to multi-stream transmission and power allocation techniques, adaptive modulation and coding (AMC) techniques can use CSIT to operate on the transmit signal before transmission on the array 106.

With conventional closed-loop MIMO systems, full broadband channel knowledge at the transmitter may be obtained by using uplink sounding techniques (e.g., with Time Division Duplexing (TDD) systems). Alternatively, channel feedback techniques can be used with MIMO systems (e.g., with TDD or Frequency Division Duplexing (FDD) systems) to feed back channel information to the transmitter. One way of implementing precoding over a low rate feedback channel is to use codebook-based precoding to reduce the amount of feedback as compared to full channel feedback. However, even when codebook-based techniques are used to quantize the feedback information, feedback from multiple receivers can cause an uplink bottleneck. Specifically, allowing all users to feed back causes the total feedback rate to increase linearly with the number of users, placing an burden on the uplink control channel shared by all users (e.g. as proposed by 3GPP LTE).

Accordingly, an efficient feedback scheduling methodology is needed to provide the channel information to the transmitter while sustaining a minimal loss in link performance. There is also a need for an improved feedback control system which avoids degrading uplink performance and reduces long feedback delay. In addition, there is a need for a system and methodology for reducing the average precoder feedback rate to reduce uplink performance loss and feedback delay. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

Figure 1:
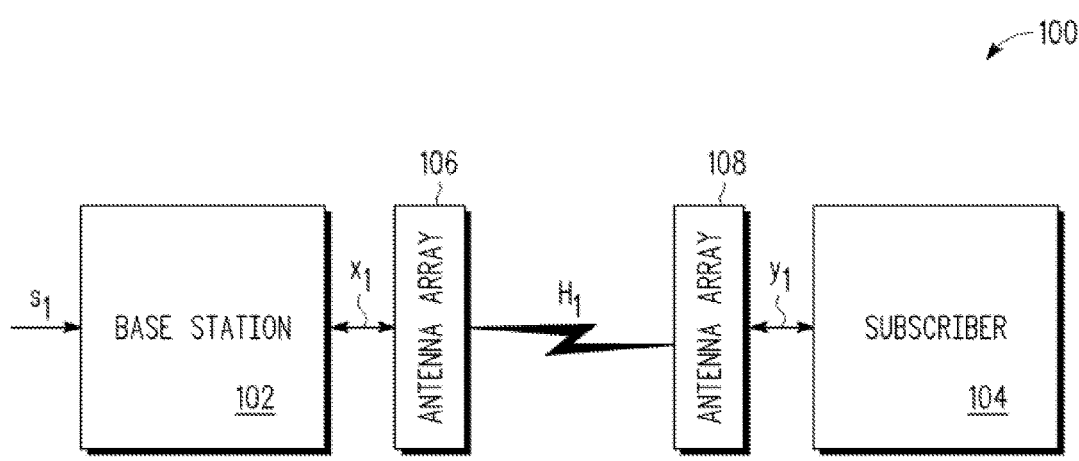
FIG. 1 (labeled prior art) depicts a wireless communication system.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

A feedback control system and methodology are described for use in controlling precoder feedback in multi-input, multiple output (MIMO) systems. A scheduler at a base station defines a criterion/criteria for users to constrain or reduce the precoder feedback rate by controlling which users can feed back precoding weights and how much feedback can be sent. By generating and broadcasting feedback control criterion/criteria at the base station, each receiving device can use the feedback control criterion/criteria to determine a feedback constraint so that the receiving devices do not needlessly feed back precoding information to the base station. For example, each receiving device can evaluate the feedback control criterion/criteria to determine if precoding information is to be fed back by the receiving device and/or how much feedback can be sent. In a selected embodiment, feedback is scheduled using a predetermined schedule (e.g., round-robin) which allows each receiver/user to provide precoder feedback at a predetermined time or event. In other embodiments, feedback is scheduled using a metric-based (e.g. proportional fairness and maximum throughput) scheduler. By distributing a feedback indicator (such as a predetermined criterion) from the base station to the users to control feedback, the total feedback rates are effectively reduced. In operation, a base station determines feedback control criterion (such as a feedback threshold or feedback schedule) or criteria (where the criteria could be user-specific or for a subgroup of users) and then broadcasts the feedback control criterion or criteria to the receiver/users. In selected embodiments, the base station can generate and send a plurality of thresholds using a predetermined metric for each threshold, where one threshold is for each user or group of users. At each receiver, the feedback control criterion is used to control and limit the transmission of feedback information (e.g., precoder coefficients or codebook indices) over the uplink control channel to the base station. For example, each user can evaluate the feedback control criterion received from the base station to determine if the user is likely to be scheduled in downlink. If not, then the receiver may avoid the processing required to prepare for and send feedback. However, if the user's evaluation of the received feedback control criterion indicates that the user is likely to be scheduled, then the required feedback processing may be performed at the receiver so that the receiver's MIMO precoder coefficients/index can be fed back to the base station, alone or in combination with channel quality indicator (CQI) information estimated by the receiver. By feeding back the CQI and precoder coefficients/indices in combination, the downlink performance may be improved since there is small or no delay between the feedback of the CQI information and the precoder coefficients/index information. In addition or in the alternative, each user may be configured to use and/or modify the received feedback indicator (such as the feedback control criterion) to determine its own schedule for feeding back precoder coefficients/index information and/or CQI information, though in this case, an independent uplink channel must be provided to support such feedback. In another embodiment, the feedback threshold indicator broadcast by the base station can act as a trigger for the user to send precoding feedback.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
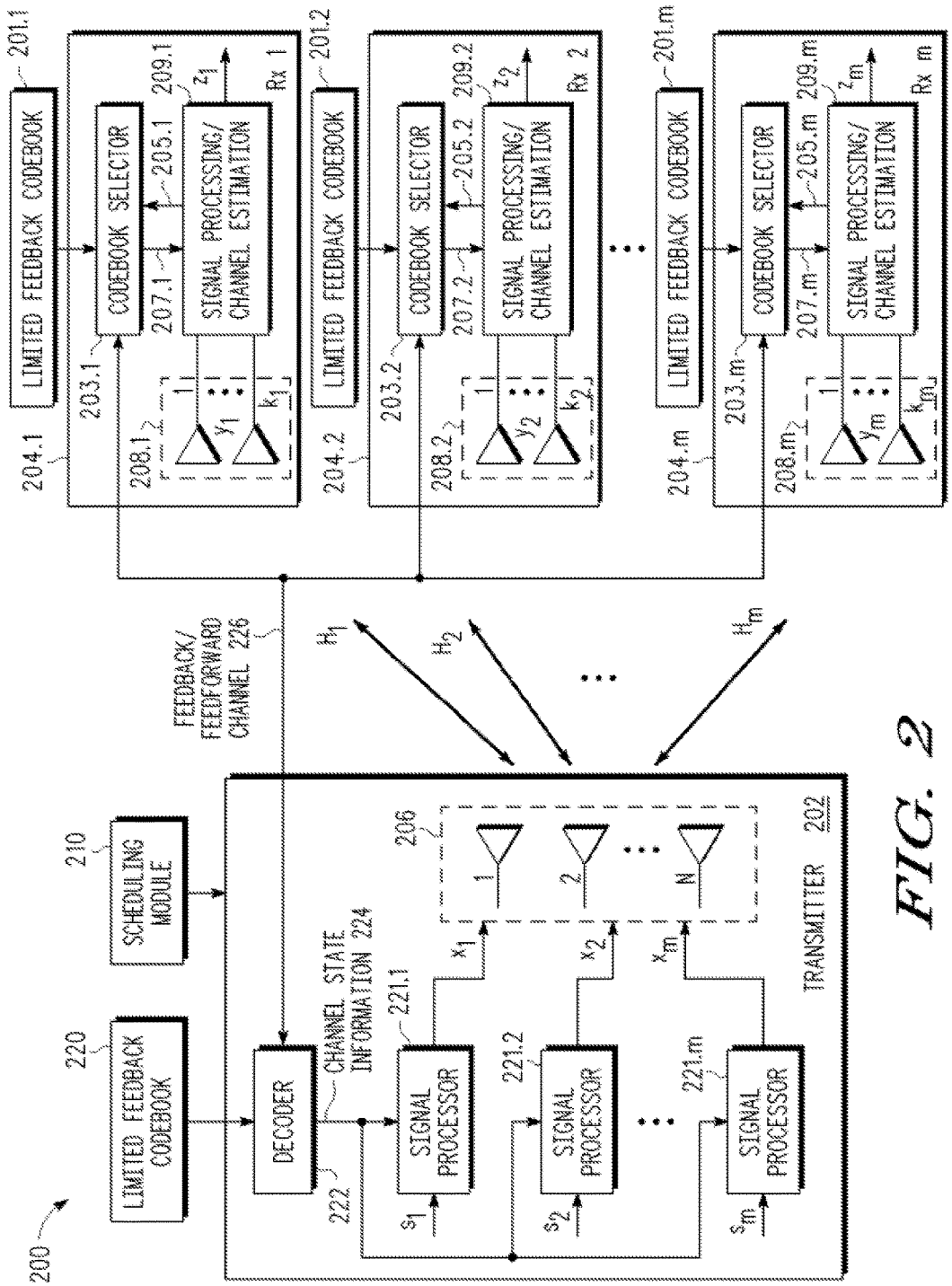
FIG. 2 depicts a wireless communication system in which a scheduling module is used to coordinate feedback from a plurality of receiver stations to a transmitter station.

FIG. 2 depicts a wireless communication system 200 in which a scheduling module 210 is used to coordinate feedback from a plurality of receiver stations 204.1-204.$m$ (e.g., subscriber stations) to a transmitter station 202 (e.g., base station). The transmitter 202 includes an array 206 of one or more antennas for communicating with the receivers 204.1 through 204.$m$, each of which includes an array 208.$i$ having one or more antennas for communicating with the transmitter 202. In operation, a data signal $s_i$ presented at the transmitter 202 for transmission to the receiver 204.$i$ is transformed by the signal processor 221.$i$ into a transmission signal, represented by the vector $x_i$. The signals transmitted from the transmit antenna 206 propagate through a matrix channel $H_i$ and are received by the receive antennas 208.$i$ where they are represented by the vector $y_i$. For a MIMO channel from the transmitter 202 to the $i^{th}$ receiver 204.$i$, the channel is denoted by $H_i$, $i \in \{1, 2, \ldots, m\}$. The channel matrix $H_i$ may be represented as a $k_i \times N$ matrix of complex entries representing the complex coefficients of the transmission channel between each transmit-receive antenna pair, where N represents the number of transmitter 202 antennas, and $k_i$ represents the number of antennas of the $i^{th}$ receiver 204.$i$. At the receiver 204.$i$, the signal processing unit 209.$i$ processes the $y_i$ signals received on the k antennas to obtain a data signal, $z_i$, which is an estimate of the transmitted data $s_i$. The processing of the received $y_i$ signals may include combining the $y_i$ signals with appropriate combining vector information 207.$i$ retrieved from the codebook 201.$i$.

Precoding for downlink transmissions (transmitter to receiver) may be implemented by having each receiver 204.$i$ determine its MIMO channel matrix $H_i$—which specifies the profile of the transmission channel between a transmitter and an $i^{th}$ receiver—in the channel estimation signal processing unit 209.$i$. For example, in a MIMO implementation, each receiver 204.1-$m$ determines its MIMO channel matrix $H_i$ by using pilot estimation or sounding techniques to determine or estimate the coefficients of the channel matrix $H_i$. Each receiver 204.$i$ uses the estimated MIMO channel matrix or other channel-related information (which can be channel coefficients or channel statistics or their functions, such as a precoder, a beamforming vector or a modulation order) to generate precoding information, such as precoding and power allocation values, appropriate for the MIMO channel matrix. This may be done by using the channel-related information to access a precoder stored in the receiver codebook 201.$i$. In addition and depending on the system design, each receiver 204.$i$ determines the channel-related information required for adaptive modulation and coding.

Rather than feeding back the entire vector or matrix representation of the transmission channel or related precoding matrix or precoding information (which would require a large number of bits), the receiver 204.$i$ uses a codebook 201.$i$ to quantize the precoding information that is generated from the estimated channel matrix information and that will be used by the transmitter in controlling signal transmission to the receiver. The receiver codebook 201.$i$ may be used to store an indexed set of possible channel profiles or matrices $H_i$ along with associated precoding matrix or precoding information so that the estimated channel matrix information 205.$i$ generated by the signal processing unit 209.$i$ can be used by the codebook selector 203.$i$ to retrieve an index from the limited feedback codebook 201.$i$ and provide the retrieved index over a feedback channel (e.g., a low rate feedback channel 226) to the transmitter 202. Based on the feedback of the precoding index, the decoder 222 at the transmitter 202 retrieves from the codebook 220 a matching transmission channel profile or related precoding information 224 for a particular subscriber station 204.$i$ which is used to precode the transmission signal (e.g., $s_1$). In this way, codebook-based feedback enables a variety of techniques, including but not limited to precoding, power allocation, and adaptive modulation and coding. While the present description is directed primarily to the example of performing precoding for downlink signal transmissions, it will be appreciated that precoding for uplink transmissions may also be implemented by having the transmitter 202 determine or estimate the uplink MIMO channel matrix information and use this information to generate a precoding index which is fed back to the receiver 204.$i$ to control signal transmissions from the receiver 204.$i$ to the transmitter 202. The determination of channel gain and profile information in both directions is useful when the channel matrices used for transmitting and receiving are different (e.g. $H_{iT}$ and $H_{iR}$, from the $i^{th}$ subscriber station's perspective), such as in a frequency division duplex (FDD) system.

To coordinate or control feedback from a plurality of receivers 204.1-204.$m$ to a single transmitter 202, a scheduling functionality is provided at the transmitter 202 which uses the precoding information along with CQI to determine which users are getting transmissions in their downlink, such as by providing a scheduling code that is stored in a scheduling module 210. The scheduling module also implements one or more algorithms for generating feedback control criterion/criteria which are used by the receiver(s) to determine when a receiver should feed back precoding information, such as quantized precoding information. For example, the scheduling module 210 may be used to implement a round-robin schedule whereby transmission time slots are allocated to each receiver 204.$i$. Based on the round-robin schedule, the transmitter 202 generates and broadcasts feedback synchronization signals based on the estimated round-trip delay for each user, where the feedback synchronization signals specify the feedback instants and durations to be used by each user to send its precoding information in its assigned time slot. In another example implementation where the scheduling module 210 implements a metric-based (e.g. proportional fairness and maximum throughput) schedule to select users for downlink transmission, feedback is controlled by having the transmitter 202 estimate a metric distribution of the scheduled users, and then use the metric distribution to determine a feedback threshold which is met by at least one user for a predetermined probability. Once the metric-based feedback threshold is distributed to the receivers 204.1-204.$m$, each receiver provides feedback when the metric-based feedback threshold is satisfied. In effect, the distributed feedback threshold/synchronization signals act as triggers at each receiver to control and coordinate the feedback from the receivers 204.1-204.$m$, thereby reducing the total feedback rates to the receiver at any given time. In other embodiments, the user/receiver may modify the trigger to determine its feedback schedule.

In selected embodiments, each user/receiver 204.$i$ stores its metric-based feedback threshold, and may also use and/or update the metric-based feedback threshold information to thereby adjust the decision about if and when to feed back precoding information. For example, the transmitter 202 may broadcast a feedback indicator to all receivers 204.1-$m$ in the form of a metric-based feedback threshold. At each receiver 204.$i$, the signal processing module 209.$i$ may be configured to use and/or modify the received feedback indicator to determine its own schedule for feeding back precoder coefficients/index information and/or CQI information. By scheduling the feedback of the CQI and precoder coefficients/indices to occur together, the downlink performance may be improved since there is no delay between the feedback of the CQI information and the precoder coefficients/index information. To provide an example of how the feedback indicator may be used or modified, a receiver 204.$i$ that tracks or stores the scheduling history for the receiver may determine that precoding feedback should not occur by using the feedback indicator to determine that the receiver has been scheduled frequently enough, since this indicates that the receiver is unlikely to be scheduled again in the next scheduling cycle. On the other hand, if the scheduling history indicates that the receiver 204.$i$ is likely to be scheduled in the next scheduling cycle based on the feedback indicator, then the precoding feedback and processing is performed by the receiver. In this way, needless feedback and feedback processing at the receiver 204.$i$ may be avoided. By the same token, the receiver 204.$i$ can evaluate the received feedback indicator to avoid needless feedback processing upon determining that the receiver 204.$i$ is not likely to meet the scheduling feedback threshold contained in the indicator. In addition or in the alternative, the receiver 204.$i$ can modify or update the received feedback indicator to avoid needless feedback processing and/or to adjust the timing of when the precoder coefficients/index information and/or CQI information are fed back to the transmitter 202. As will be appreciated, if the receiver 204.$i$ is adjusting the timing of when the feedback occurs, an independent uplink channel must be provided to support such feedback.

Figure 3:
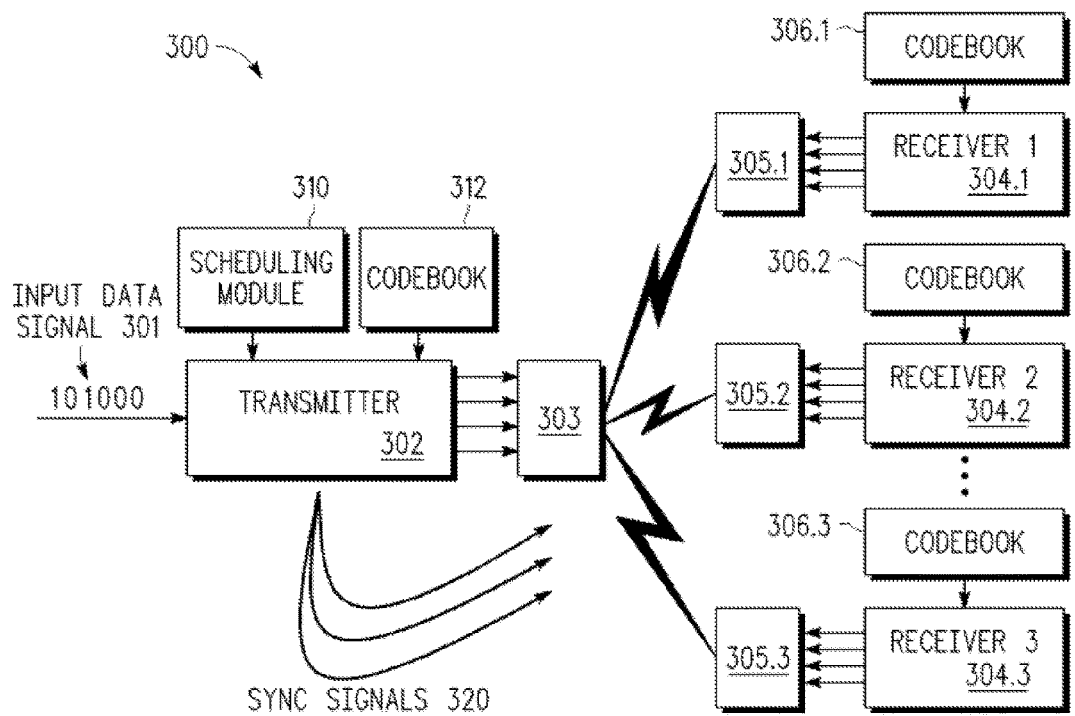
FIG. 3 depicts a block diagram of a transmitter that uses a scheduling module to control feedback operations from a plurality of receivers.

FIG. 3 depicts a wireless communication MIMO system 300 in which a transmitter station 302 communicates with a plurality of receiver stations 304.1-3 using a feedback control operation which is implemented as a round-robin scheduler. As depicted, the transmitter station 302 includes an array 303 of multiple antennas for communicating with the receiver stations 304.1-3, and each receiver station includes respective antenna arrays 305.1-3 for communicating with the transmitter station 302. In accordance with various illustrative embodiments of the wireless communication system 300, the transmitter station 302 includes a codebook 312 which is accessed to obtain a transmission profile and/or precoding information to be used to process the input data signal 301 to make best use of the existing channel conditions for individual receiver stations. In addition, each receiver station includes the same codebook 306.$i$ for use in efficiently transferring information in either the feedback or feedforward control channel, as described herein below. To control the timing of when feedback occurs from the different receivers, the transmitter 302 also includes a scheduling module 310 which schedules or controls feedback operations from the receivers 304.$i$ using control logic, software instructions, control code, hardwired circuitry or the like. As described herein, the feedback from the receivers may be scheduled or controlled using any desired approach that effectively reduces the cumulative feedback rate from the receivers 304.$i$ to the transmitter 302 at any given time. Regardless of what approach is used at the transmitter 302 to schedule or control the receiver feedback, the transmitter 302 feeds forward the feedback control information as scheduling or synchronization signals 320 to the respective receivers 304.$i$. In accordance with the foregoing, the transmitter station 302 and/or receiver station 304.$i$ include a processor, software executed by the processor, and other hardware that allow the processes used for communication and any other functions performed by the transmitter station 302 and each of receiver stations 304.$i$.

Figure 4:
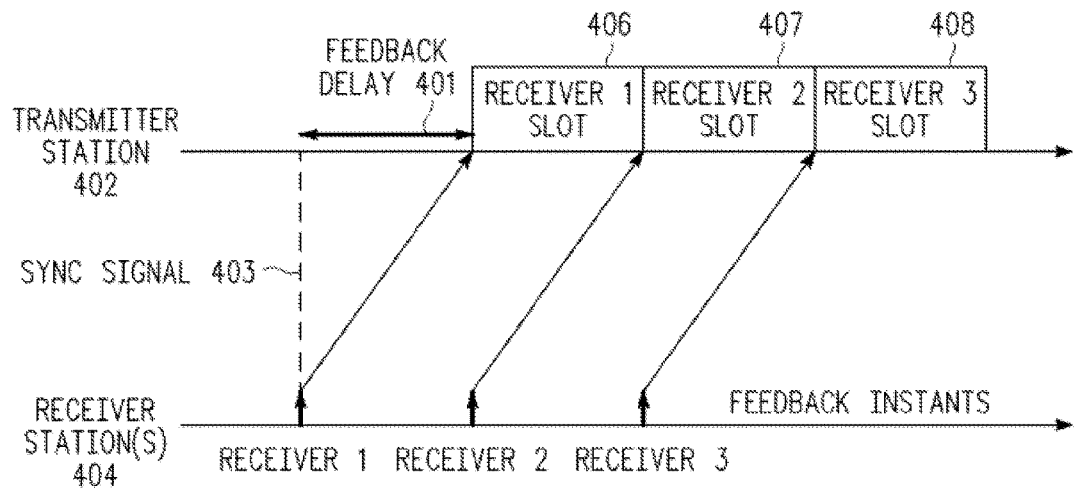
FIG. 4 depicts a feedback control operation using round-robin scheduler.

In accordance with a first illustrative embodiment for scheduling receiver feedback illustrated in FIG. 4, the feedback control operation implemented by the transmitter 402 uses a round-robin scheduler to control the feedback operations from a plurality of receivers 404. As illustrated, a transmitter station 402 allocates sequential transmission time slots 406-408 to a plurality of receiver stations 404 by first computing an estimate of the feedback delay 401, which is the round-trip delay for a signal (e.g., a synch signal 320) to be transmitted to the first receiver (e.g., Receiver 1) and for a feedback signal to be returned to the transmitter 402. The transmitter 402 then broadcasts feedback synchronization signals 403 to the receivers 404 using the downlink control channel, which indicates the feedback instants and durations for each receiver. Based on the received synchronization signal, each receiver sends back precoder information only in the corresponding time slot for that receiver. With this approach, the transmitter 402 is prepared to receive precoding feedback information for Receiver 1 during a first time slot 406, is prepared to receive precoding feedback information for Receiver 2 during a second time slot 407, and is prepared to receive precoding feedback information for Receiver 3 during a third time slot 408. By having each receiver provide feedback in a predetermined order and only during a scheduled time slot, the cumulative feedback rate from the receivers 404 to the transmitter 402 at any given time is reduced, as compared to an asynchronous feedback scheme where all receivers can feed back precoding information at any time.

Selected embodiments of the present invention may also be illustrated with reference to FIG. 5, which depicts a simplified process flow 500 for scheduling receiver feedback at a base station using a round-robin scheduler to sequentially allocate transmission time slots to a plurality of users. As will be appreciated, round-robin scheduling may be implemented with a variety of communication system configurations. For example, the wireless communication MIMO system 300 depicted in FIG. 3 may provide for a round-robin scheduling functionality in the scheduling module 310.

Figure 5:
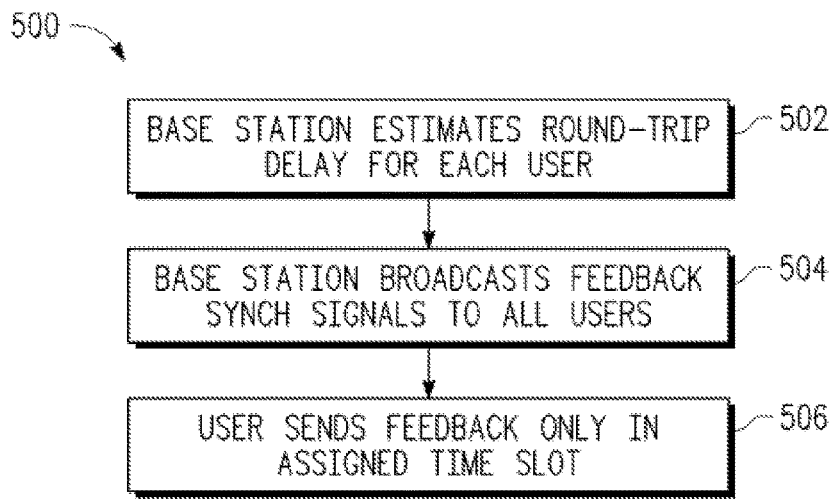
FIG. 5 depicts a first example flow methodology for scheduling receiver feedback.

As depicted in FIG. 5, the base station estimates the round-trip delay for each user at step 502. Based on the computed round-trip delay, the base station computes feedback synchronization signals for all users, and broadcasts the feedback synchronization signals to all users using the downlink control channel at step 504. The feedback synchronization signals may specify any desired order or sequence of feedback by the receivers, such as, for example, specifying a feedback sequence of users that follows that of their scheduled downlink transmissions. The feedback synchronization signal sent to each user indicates the feedback instants and durations for the user, so that each user is assigned a specified time slot for feeding back precoding information. Once the synchronization signal for a user is received and processed, the user sends back its precoding information only in the assigned time slot (step 506).

Figure 6:
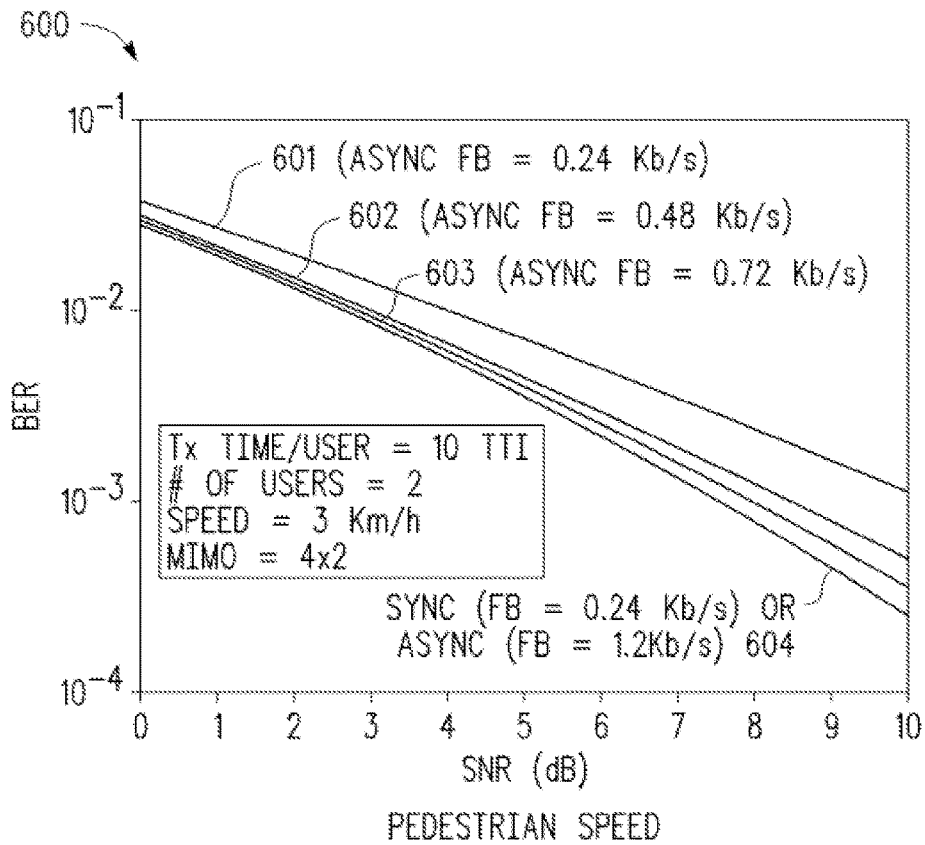
FIG. 6 depicts a simulated comparison of a feedback control system using a predetermined schedule to synchronize feedback and an asynchronous feedback system.

Next, the performance of a scheduled feedback system is evaluated using a Monte Carlo simulation to demonstrate the effectiveness of scheduling feedback during assigned time slots. In particular, FIG. 6 compares the BER vs. SNR curves for a feedback control system using a predetermined schedule and for an asynchronous feedback system where each user continuously feeds back precoding information because the base station does not synchronize the feedback from the users. In the simulation, the BER vs. SNR curves are simulated for a transmitter that communicates over 4×2 MIMO channel to two users moving at pedestrian speed (e.g., 3 km/h) where the transmission time per user is 10 subframes. As the simulation shows, a synchronized or scheduled feedback system can obtain a target bit error rate (BER) performance with a lower feedback rate than is required to reach the same or similar target BER with an asynchronous feedback system. For example, the curve 601 depicts the BER vs. SNR curve for an asynchronous feedback rate of 0.24 kb/s, while the curve 602 depicts the BER vs. SNR curve for an asynchronous feedback rate of 0.48 kb/s, and the curve 603 depicts the BER vs. SNR curve for an asynchronous feedback rate of 0.72 kb/s. As for the curve 604, this curve depicts the BER vs. SNR curve for an asynchronous feedback rate of 1.2 kb/s, and also depicts the BER vs. SNR curve for a synchronous feedback rate of 0.24 kb/s. As these curves demonstrate, for similar performance, the synchronous case requires smaller feedback rates than the asynchronous case, and for similar feedback rates, the synchronous case outperforms the asynchronous case. While a similar simulation can be made to address different conditions (e.g., where the receivers move at a higher speed), the synchronous case again uses a lower feedback rate to provide similar performance, or otherwise outperforms an asynchronous case at the same feedback rate.

Figure 7:
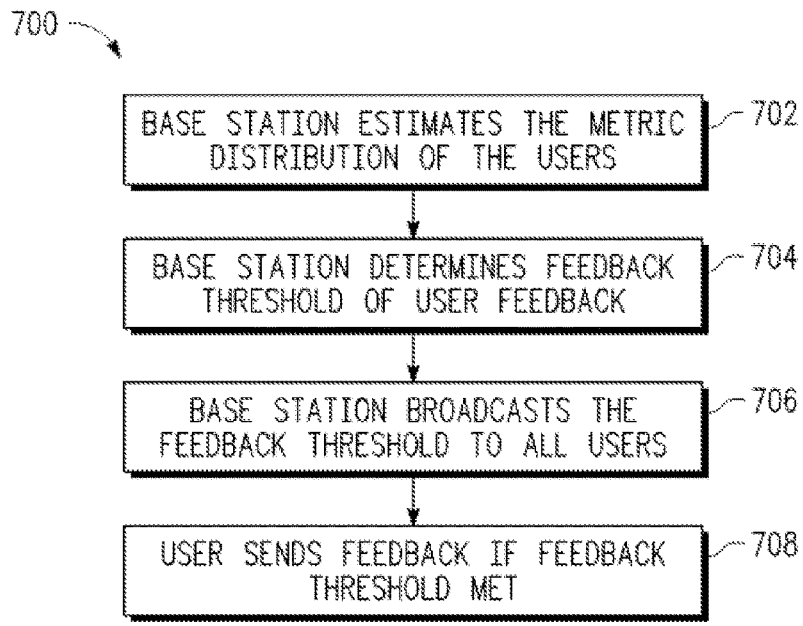
FIG. 7 depicts a second example flow methodology for scheduling receiver feedback.

In accordance with various alternative embodiments of the present invention, FIG. 7 depicts a simplified process flow 700 for scheduling receiver feedback at a base station using a metric-based scheduler to use metric values associated with each receiver to select which receivers provide precoding feedback. In an example implementation, metric-based scheduling is implemented at the base station by calculating and distributing feedback threshold information to a plurality of users which use the threshold information to control if and when precoding feedback occurs. As will be appreciated, metric-based scheduling may be implemented with a variety of communication system configurations. For example, the wireless communication MIMO system 300 depicted in FIG. 3 may provide for a metric-based scheduling functionality in the scheduling module 310.

As depicted in FIG. 7, in one embodiment, a preliminary step in the metric-based scheduling methodology is for the base station to estimate the metric distribution for each user (step 702). While any desired performance metric may be used, examples of performance metrics include, but are not limited to, scheduling fairness indices, channel capacity, channel Frobenius norm, channel quality indicators, CINR (Carrier-to-Interference plus Noise Ratio) and/or SINR (Signal-to-Interference plus Noise Ratio). Based on the computed metric distribution, the base station computes feedback threshold information for all users (step 704). In selected embodiments, the base station uses the metric distribution to determine a feedback threshold or algorithm by which at least one user will meet the threshold by a required or predetermined probability. The computed feedback threshold information is then broadcast to all users using the feed forward or downlink control channel (step 706). The feedback threshold information specifies the conditions under which the user is to feed back precoding information. Once the feedback threshold information for a user is received and processed, the user sends back its precoding information in accordance with the control parameters specified by the feedback threshold information (step 708). In this way, only users who meet the feedback threshold send back precoding information (e.g., precoder coefficients or precoding codebook indices) through the shared uplink control channel.

Figure 8:
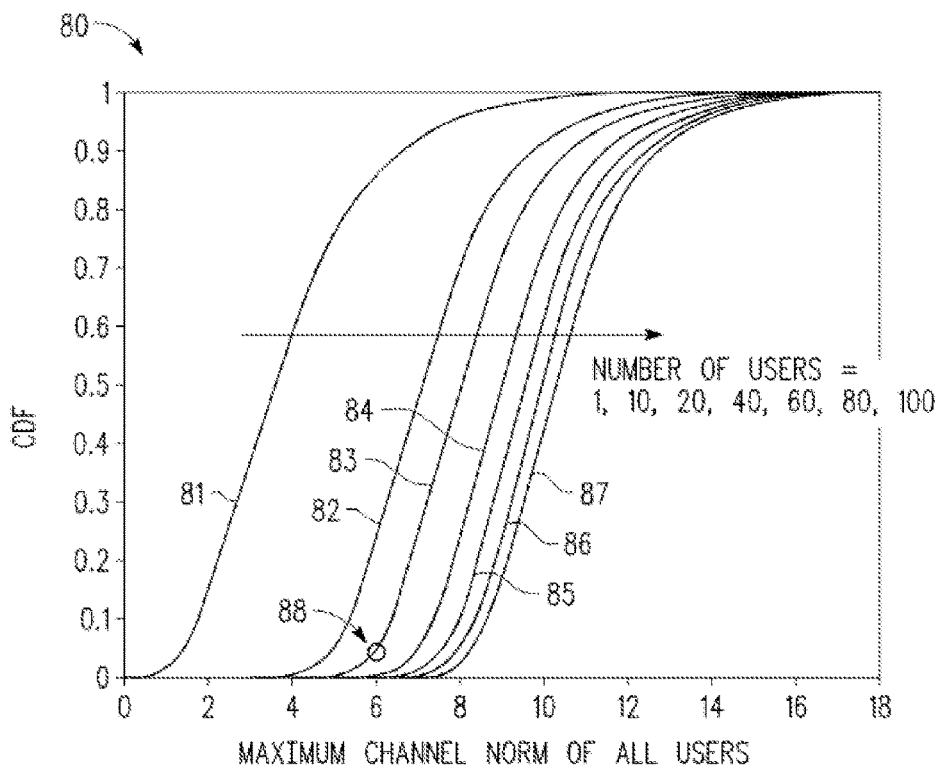
FIG. 8 depicts a plot of a cumulative density function of a scheduled user in a feedback control system using a metric-based scheduler.

An illustrative example of a metric-based scheduling approach may be provided with reference to an example MIMO communication system 300 depicted in FIG. 3 where a base station/transmitter 302 has four transmit antennas 303 and each user/receiver 304.$i$ has two receive antennas 305.$i$ so that the MIMO channel for each user is a 4×2 MIMO channel with independent identically distributed (i.i.d.) Rayleigh fading and the channels for different users are assumed to be symmetric in distribution. In this example, the scheduling module 310 uses the channel Frobenius norm as the metric to schedule feedback so that the user with the largest channel Frobenius norm in a time interval is scheduled for feedback transmission in that time interval. This may be accomplished by using a cumulative density function (CDF) of the maximal channel Frobenius norm of the scheduled user (such as plotted in FIG. 8) to calculate a feedback threshold. In particular, FIG. 8 plots the CDF curves 80 of the maximal channel Frobenius norm for a single scheduled user (curve 81), ten scheduled users (curve 82), twenty scheduled users (curve 83), forty scheduled users (curve 84), sixty scheduled users (curve 85), eighty scheduled users (curve 86), and hundred scheduled users (curve 87). From the depicted plot for a system having twenty users (curve 83) in which there is a required probability of 95% that at least one user will meet the feedback threshold, the scheduler determines that the feedback threshold is a maximum channel Frobenius norm of approximately 6 (as indicated with reference numeral 88).

Figure 9:
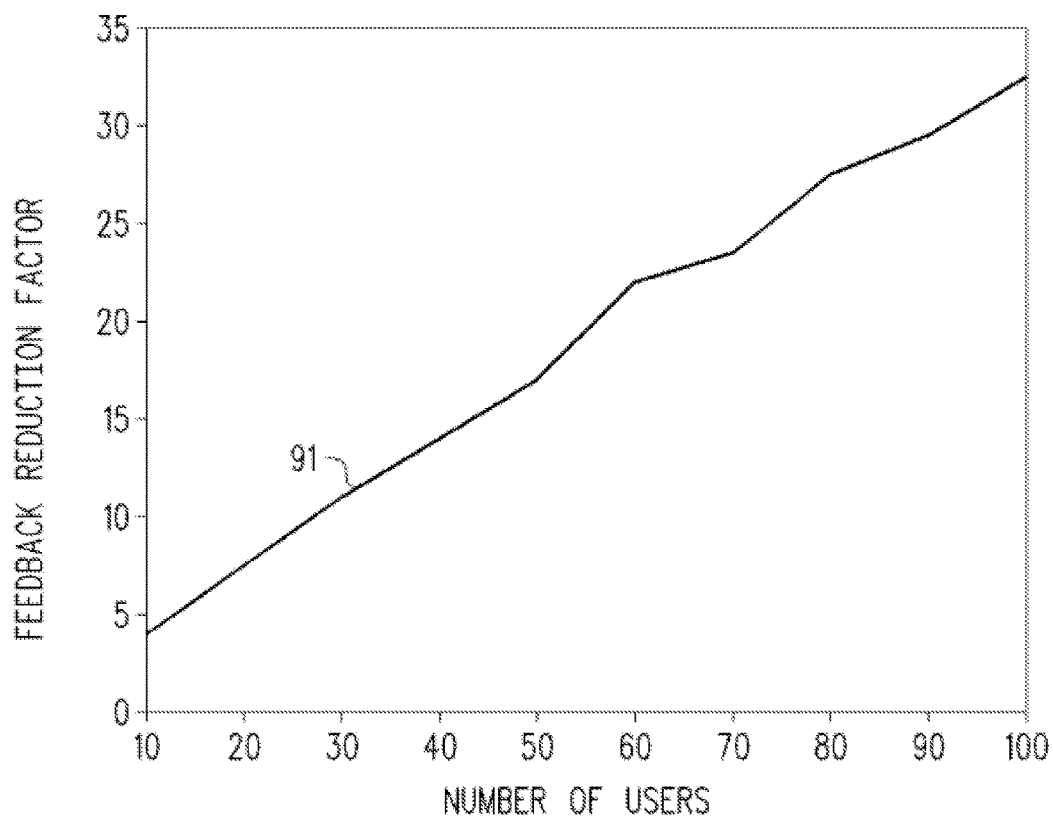
FIG. 9 depicts plot of a feedback reduction factor for a feedback control system using a metric-based scheduler.

To demonstrate how metric-based scheduling can be used to reduce the precoding feedback rate, FIG. 9 depicts plot of a feedback reduction factor for a feedback control system using a metric-based scheduler. As used herein, the feedback reduction factor is the ratio between (a) the average precoder feedback rate when a metric-based scheduling technique is used and (b) the average precoder feedback rate for the conventional asynchronous case where all users continuously feed back precoder information. FIG. 9 plots the feedback reduction factor 91 against the number of users, where the channel Frobenius norm is the scheduling metric used to compute the feedback reduction factor. As depicted in the plot 91, significant feedback reduction is observed even for merely ten users, and the reduction factor increases with the number of users.

By now it should be appreciated that there has been provided a method and system for controlling feedback of precoding information in a MIMO communication system wherein a transmitting device communicates with a plurality of receiving devices over a corresponding plurality of transmission channels. As disclosed, feedback control information is generated at the transmitting device for each receiving device to control feedback of precoding information from the receiving devices so that the receiving devices do not needlessly feed back precoding information to the transmitting device. The feedback control information is then transmitted or broadcast to the receiving devices, each of which feeds back precoding information to the transmitting device in accordance with the feedback control information allocated for each receiving device. Based on the feedback control information, each receiving device can determine a feedback constraint so that the receiving devices do not needlessly feed back precoding information to the transmitting device. For example, each receiving device can evaluate the feedback control information to determine if precoding information is to be fed back by the receiving device and/or how much feedback can be sent. In this way, each receiving device uses the feedback control information to schedule the feedback of precoding information, such as information representing a profile specifying a precoding parameter, a power allocation parameter or an adaptive modulation and coding parameter. In selected embodiments, the feedback control information defines a schedule specifying a time slot for each receiving device to feed back precoding information to the transmitting device. The schedule may be defined by estimating a round-trip delay for each of the plurality of receiving devices, and then using the round-trip delay for each receiving device to compute a feedback instant and duration for each receiving device, where the feedback instant and duration specify a time slot during which each receiving device is to feed back precoding information to the transmitting device. In this case, the feedback control information may be broadcast to the receiving devices by sending a synchronization signal to each receiving device over a downlink control channel, where the synchronization signal specifies the time slot for the said receiving device. In other embodiments, the feedback control information defines a feedback threshold which specifies a metric value at each receiving device that must be met before precoding information can be fed back to the transmitting device. The metric value (e.g., a scheduling fairness index, a channel capacity, a channel Frobenius norm, a channel quality indicator, a CINR value or an SINR value) may be generated by estimating a metric distribution for the plurality of receiving devices, and computing the feedback threshold from the metric distribution, where the feedback threshold specifies a metric value. In this way, at least one receiving device having a metric value that meets or exceeds the feedback threshold can feed back precoding information to the transmitting device. In various embodiments, the precoding information or channel quality indicator information are both received at the transmitting device from each of the plurality of receiving devices, where each receiving device feeds back precoding information and channel quality indicator information together in accordance with the feedback control information for said receiving device.

In another form, there is provided a method and system for controlling feedback of precoding information in a MIMO communication system wherein a base station communicates with a plurality of user equipment devices over a corresponding plurality of transmission channels. As disclosed, a first user equipment device receives feedback control information from a base station, where the base station generates the feedback control information to control feedback of precoding information from the user equipment devices so that the user equipment devices do not needlessly feed back precoding information to the base station. In accordance with the feedback control information received at the first user equipment device, precoding information (such as information representing a profile specifying a precoding parameter, a power allocation parameter or an adaptive modulation and coding parameter) is fed back by the first user equipment device to the base station. For example, the first user equipment device may evaluate the feedback control information to determine if precoding information is to be fed back by the first user equipment device and/or to determine how much feedback to send. In selected embodiments, the feedback control information defines a schedule specifying a time slot for the first user equipment device to feed back precoding information to the base station. The schedule may be defined by a feedback instant and duration for the first user equipment device, where the feedback instant and duration specify a time slot during which the first user equipment device is to feed back precoding information to the base station. In this case, the feedback control information may be broadcast to the first user equipment device by sending a synchronization signal to the first user equipment device over a downlink control channel, where the synchronization signal specifies the time slot for the first user equipment device. In other embodiments, the feedback control information defines a feedback threshold which specifies a metric value that must be met before the first user equipment device can feed back precoding information to the base station. The metric value (e.g., a scheduling fairness index, a channel capacity, a channel Frobenius norm, a channel quality indicator, a CINR value or an SINR value) may be generated by estimating a metric distribution for the plurality of user equipment devices, and computing the feedback threshold from the metric distribution, where the feedback threshold specifies a metric value. In this way, at least one user equipment device having a metric value that meets or exceeds the feedback threshold can feed back precoding information to the base station. In various embodiments, the precoding information and channel quality indicator information are both received at the base station from the first user equipment device, where the first user equipment device feeds back either precoding information or channel quality indicator information together in accordance with the feedback control information for the first user equipment device. As disclosed, the feedback control information may act as a trigger at the first user equipment device to control and coordinate the feedback from the first user equipment device. In addition, the feedback control information may be evaluated by tracking a scheduling history for the first user equipment device to determine if the first user equipment device has been frequently scheduled so that precoding information need not be fed back in a subsequent scheduling cycle. Alternatively, the scheduling history may be tracked to determine if the first user equipment device has not been frequently scheduled so that precoding information should be fed back in a subsequent scheduling cycle.

In yet another form, there is provided a base station for use in a wireless communication system. The base station includes scheduling logic operable to define one or more scheduling criteria for scheduling feedback of precoding information at each of a plurality of user devices so that each user device feeds back precoding information under control of the one or more scheduling criteria. For example, each user device may evaluate the one or more scheduling criteria to determine if precoding information is to be fed back by the user device and/or to determine how much feedback to send. In selected embodiments, the scheduling logic is operable to sequentially allocate a transmission time slot to each of the plurality of user devices to thereby define a predetermined schedule for feedback of precoding information by each user device. In other embodiments, the scheduling logic is operable to estimate a metric distribution for the plurality of user devices and to determine a feedback threshold from the metric distribution so that at least one user device has a predetermined probability of meeting the feedback threshold. In other embodiments, the scheduling logic is operable to estimate a metric distribution for the plurality of user devices and to determine a plurality of feedback thresholds from the metric distribution, where each threshold is assigned to one or more user devices. In addition, the base station includes transmission logic operable to broadcast the one or more scheduling criteria to the plurality of user devices using a downlink channel.

The methods and systems for scheduling and controlling precoding feedback in a limited feedback MIMO system as shown and described herein may be implemented in software stored on a computer-readable medium and executed as a computer program on a general purpose or special purpose computer to perform certain tasks. For a hardware implementation, the elements used to perform various signal processing steps at the transmitter (e.g., coding and modulating the data, precoding the modulated signals, preconditioning the precoded signals, generating feedback schedule information and so on) and/or at the receiver (e.g., recovering the transmitted signals, demodulating and decoding the recovered signals, feeding back precoding information and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various MIMO precoding feedback systems and methods for using same, the present invention is not necessarily limited to the example embodiments illustrate herein. For example, various embodiments of a MIMO precoding feedback system and methodology disclosed herein may be implemented in connection with various proprietary or wireless communication standards, such as IEEE 802.16e, 3GPP-LTE, DVB and other multi-user MIMO systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A user equipment device, comprising:
  a plurality of antennas configured to communicate with a base station of a MIMO communication system;
  a processor coupled to the plurality of antennas, the processor configured to cause the user equipment device to:
    receive, via at least one antenna of the plurality of antennas, feedback control information from the base station, the feedback control information comprising a scheduling feedback threshold;
    track a scheduling history for the user equipment device to determine if the user equipment device has been scheduled more than the scheduling feedback threshold; and
    generate precoding information in response to a determination that the user equipment device has not been scheduled more than the scheduling feedback threshold, wherein the precoding information is generated at least in part based on estimated channel matrix information, and wherein the precoding information is not generated in response to a determination that the user equipment device has been scheduled more than the scheduling feedback threshold.

2. The user equipment device of claim 1, where the feedback control information comprises a schedule specifying a time slot for the user equipment device to feed back precoding information to the base station.

3. The user equipment device of claim 2, where the feedback control information comprises a feedback instant and duration for the user equipment device, where the feedback instant and duration specify a time slot during which the user equipment device is to feed back precoding information to the base station.

4. The user equipment device of claim 2, where, in receiving feedback control information, the processor is further configured to cause the user equipment device to receive a synchronization signal over a downlink control channel, where the synchronization signal specifies the time slot for the user equipment device.

5. The user equipment device of claim 1, where the precoding information fed back from the user equipment device comprises information representing a profile specifying a precoding parameter, a power allocation parameter or an adaptive modulation and coding parameter.

6. The user equipment device of claim 1, where the feedback control information comprises a feedback threshold specifying a metric value that must be met before the user equipment device can feed back precoding information to the base station.

7. The user equipment device of claim 6, where the feedback control information comprises a feedback threshold that is computed from a metric distribution for a plurality of user equipment devices of the MIMO communication system, where the feedback threshold specifies a metric value that will be met by at least one user equipment device of the plurality of user equipment devices to a predetermined probability so that the user equipment device can feed back precoding information to the base station if the user equipment device has a metric value that meets or exceeds the feedback threshold.

8. The user equipment device of claim 1, where, in feeding back precoding information, the processor is further configured to cause the user equipment device to feed back precoding information and channel quality indicator information together in accordance with the feedback control information for the user equipment device.

9. The user equipment device of claim 1, where feedback control information act as a trigger at the user equipment device to control and coordinate the feedback from the user equipment device.

10. A non-transitory computer-readable medium storing instructions executable by a processor of a user equipment device to cause the user equipment device to:
receive feedback control information from a base station of a MIMO communication system, the feedback control information comprising a scheduling feedback threshold;
track a scheduling history for the user equipment device to determine if the user equipment device has been scheduled more than the scheduling feedback threshold; and
generate precoding in response to a determination that the user equipment has not been scheduled more than the scheduling feedback threshold, wherein the precoding information is generated at least in part based on estimated channel matrix information, and wherein the precoding information is not generated in response to a determination that the user equipment has been scheduled more than the scheduling feedback threshold.

11. The non-transitory computer-readable medium of claim 10, where the feedback control information comprises a schedule specifying a time slot for the user equipment device to feed back precoding information to the base station.

12. The non-transitory computer-readable medium of claim 11, where the feedback control information comprises a feedback instant and duration for the user equipment device, where the feedback instant and duration specify a time slot during which the user equipment device is to feed back precoding information to the base station.

13. The non-transitory computer-readable medium of claim 11, wherein, in receiving feedback control information, the instructions are further executable to cause the user equipment device to receive a synchronization signal over a downlink control channel, where the synchronization signal specifies the time slot for the user equipment device.

14. The non-transitory computer-readable medium of claim 10, where the precoding information fed back from the user equipment device comprises information representing a profile specifying a precoding parameter, a power allocation parameter or an adaptive modulation and coding parameter.

15. The non-transitory computer-readable medium of claim 10, where the feedback control information comprises a feedback threshold specifying a metric value that must be met before the user equipment device can feed back precoding information to the base station.

16. The non-transitory computer-readable medium of claim 15, where the feedback control information comprises a feedback threshold that is computed from a metric distribution for a plurality of user equipment devices of the MIMO communication system, where the feedback threshold specifies a metric value that will be met by at least one user equipment device of the plurality of user equipment devices to a predetermined probability so that the user equipment device can feed back precoding information to the base station if the user equipment device has a metric value that meets or exceeds the feedback threshold.

17. The non-transitory computer-readable medium of claim 10, where, in feeding back precoding information, the instructions are further executable to cause the user equipment device to feed back precoding information and channel quality indicator information together in accordance with the feedback control information for the user equipment device.

18. The non-transitory computer-readable medium of claim 10, where feedback control information act as a trigger at the user equipment device to control and coordinate the feedback from the user equipment device.

* * * * *